Aug. 1, 1961 J. A. DOBBINS 2,994,541
AIRPLANE TOW BAR

Filed April 21, 1960 2 Sheets-Sheet 1

INVENTOR.
John A. Dobbins
BY Eric P. Schellin
ATTORNEY.

Aug. 1, 1961  J. A. DOBBINS  2,994,541
AIRPLANE TOW BAR
Filed April 21, 1960  2 Sheets-Sheet 2
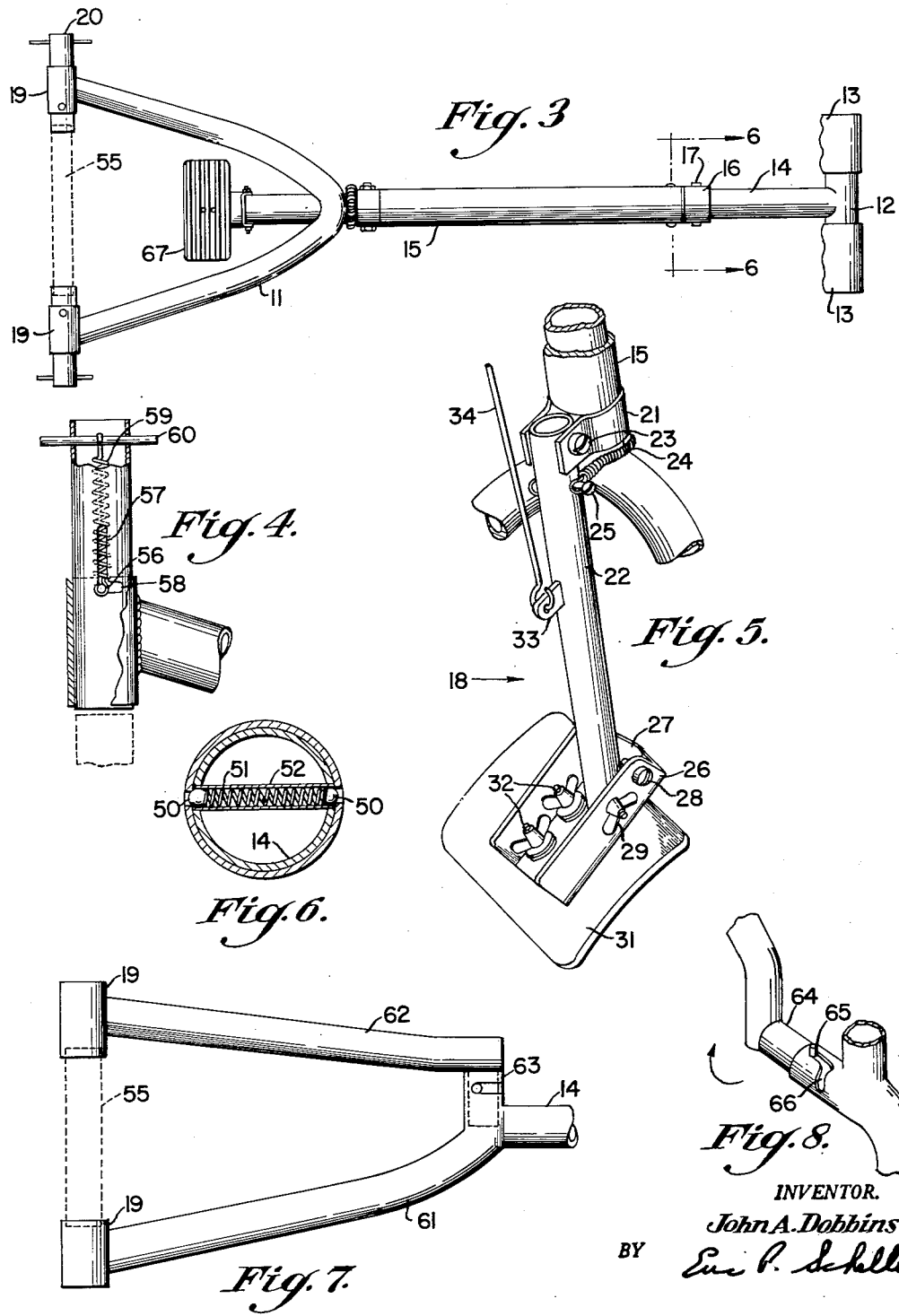
INVENTOR.
John A. Dobbins.
BY
ATTORNEY.

United States Patent Office 2,994,541
Patented Aug. 1, 1961

2,994,541
AIRPLANE TOW BAR
John A. Dobbins, 251 Cromwell Ave., San Antonio, Tex.
Filed Apr. 21, 1960, Ser. No. 23,718
10 Claims. (Cl. 280—3)

This invention relates to a device for handling aircraft. In particular, this invention relates to a device for urging the movement of an airplane in ground handling.

While there are a number of human operated tow bar devices on the market, none of them fill the requirements that they multiply the mechanical effort put forth by the operator. In other words, the aircraft tow bars of the prior art all depend upon the pulling or pushing effort of the operator without achieving any mechanical advantage.

Accordingly, it is a primary object of the present invention to disclose a simplified means whereby a steerable wheel in the landing gear of aircraft may be engaged for convenient movement of the ship.

It is another object of the present invention to disclose a tow bar having a unique lever arrangement for applying torque to the periphery of the tire of an aircraft wheel.

It is still another object of the present invention to disclose a device having an ingenious means for connecting the tow bar to the steerable wheel of aircraft.

It is a further object of the present invention to disclose a tow bar having adjustable means so that it may be employed with many types of aircraft.

Further features and objects of the invention will be apparent from the following detailed description. The invention is described in detail with reference to the accompanying drawings illustrating tow embodiments of the invention. It is, however, to be understood that the drawings are purely diagrammatical and that they intend solely to form an aid in explaining the principle of the invention and the best mode of applying the principle. Special modifications of the apparatus illustrated diagrammatically will be obvious to those skilled in this art, and therefore do not necessarily constitute a departure from the principles of the invention.

In the drawings:

FIGURE 3 is a plan view of the device.

FIGURE 4 is an enlarged and fragmentary view of the wheel axle arrangement.

FIGURE 5 is a fragmentary perspective view of the actuating shoe arrangement for applying torque to the periphery of a tire.

FIGURE 6 is a cross section taken along lines 6—6 of FIGURE 3.

FIGURE 7 shows a yoke arrangement in plan view of another embodiment.

FIGURE 8 shows the pivot arrangement for the second embodiment.

Figure 1:
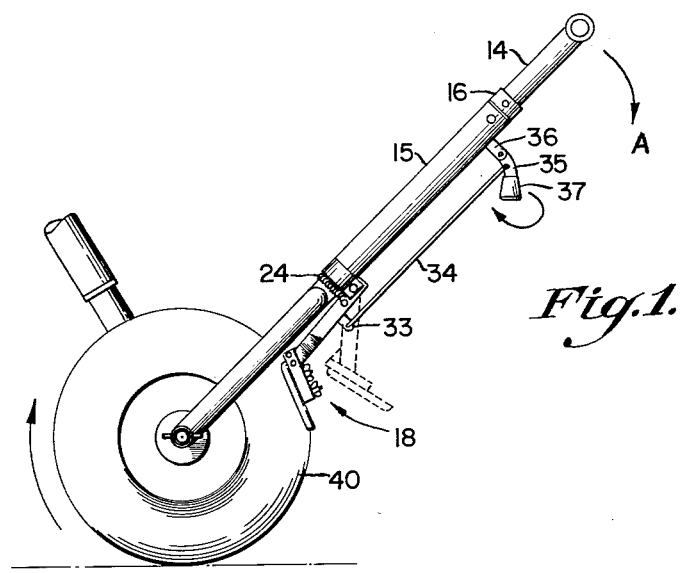
FIGURE 1 is a side elevation of the device forming the subject matter hereof and is shown attached to an aircraft wheel.
Figure 2:
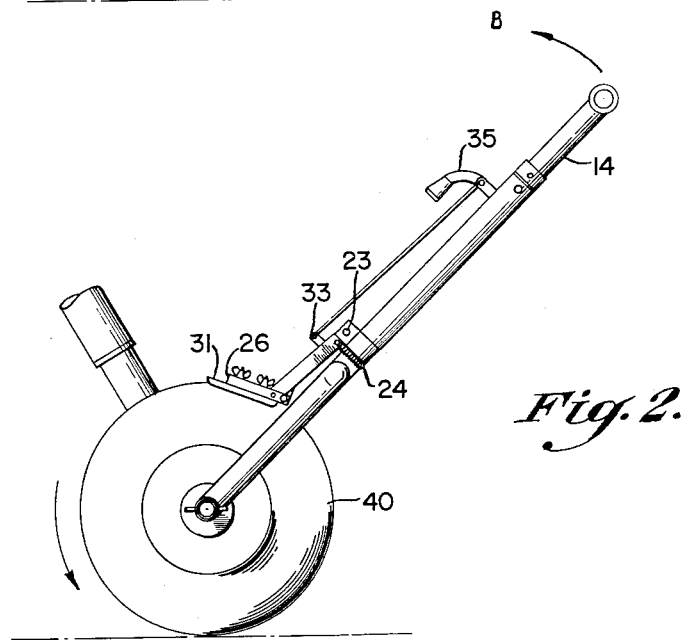
FIGURE 2 is also a side elevation of the same.

Now, turning to the drawings for a detailed consideration of the present invention, attention is directed to FIGURES 1 and 2. It will be noted therefrom that these figures illustrate the manner in which the tow bar device of the present arrangement is connected to the axle of a steerable wheel of an aircraft. This steerable wheel may be found in the nose wheel of a tricycle type landing gear of small aircraft, such as found in small executive type aircraft rather than larger commercial airplanes. The steerable wheel on aircraft employing merely two wheels in the landing gear arrangement is attached to the tail section. The present invention is particularly concerned with the modern day tricycle landing gears having a nose wheel.

For a more detailed consideration of the component parts of the device, attention is directed to FIGURES 3–6. The device is shown in its entirety in the view of FIGURE 3. The device has a tubular Y-shaped configuration. A yoke section 11 at one end encompasses the nose wheel of a tricycle type landing gear. At the other end is a handle portion 12 having suitable rubber gripping means 13 on both ends thereof. Along the base portion 14, a tubular member 15 is mounted concentrically with base 14. Tubular member 15 is prevented from moving upwardly by collar 16 which is screwed into base 14 by screws 17. Tubular member 15 carries a pivotally mounted lever and shoe arrangement shown, generally, as 18. A U-shaped fitting 21 is secured to tubular member 15 near substantially the lower end portion thereof. The lever and shoe arrangement 18 is attached between the legs of U-shaped fitting 21 by means of shaft 23 which may be a nut and bolt arrangement which passes through tubular member 22. Downward movement of tubular member 15 is inhibited by coil spring 24 which is bent into a U-shaped configuration around base 14 and is connected to opposite sides of tube 22 by means of pin 25. The other end of the tubular member 22 is secured at an oblique angle to a bracket 26. The bracket 26 is attached to the tubular member 22 by means of ear-shaped fitting 27 and nut and bolt arrangement 28 fitting therethrough. Additionally, a wing nut and bolt arrangement 29 passes transversely through the end portion of tubular member 22. An actuating shoe member 31 is attached to the bracket 26 by means of wing nuts and bolts 32. It will be seen that spring 24 urges the lever and shoe arrangement 18 towards the yoke section 11 and, concomitantly therewith, against the periphery of the tire 40.

In order to move the shoe arrangement in an arcuate manner toward and away from the nose wheel 40, means is provided to move the bracket and shoe arrangement by pivoting the tubular member 22 about pivot point 23. This means includes an ear member 33 attached to the tubular member 22 near substantially its mid-point. An elongated rod 34 is hooked into the ear member 33. The other end of the elongated member 34 is attached to a hand lever 35 (as seen in FIGURES 1 and 2). Hand lever 35 is pivoted to an extending ear portion 36 mounted near substantially the other end of tubular member 15. The other end of hand lever 35 is formed into a gripping section 37 for articulation to effect manual operation. From FIGURE 1 it will be seen that when the lever 35 is in the downward position, the shoe 31 is held against the nose wheel tire 40 by means of spring 24. When the hand lever is moved upwardly towards the operator, the elongated member 34 pulls on the lever and shoe arrangement 18 so that it assumes a position shown by the dotted line portion of FIGURE 1.

Since tubular member 15 is not rigidly attached to the base tube 14, it may be rotated about the base 14. By rotating tubular member 15 from the position shown in FIGURE 1 to the position shown in FIGURE 2, the lever and shoe arrangement will be on the upper side of the nose wheel 40. In order to prevent the tubular member from inadvertently sliding or rotating about base 14, ball detents 50 are provided, as shown in FIGURE 6. The balls are urged in outward direction by spring means 51 which is retained within the base tube 14 by encasing tube 52. The balls are urged outwardly through holes in base 14 and into alignment with suitably positioned openings in tubular member 15. The suitably positioned openings are 180 degrees apart so that the tubular member 15 may assume either of the two positions shown in FIGURES 1 and 2.

Tubular sleeves 19 are secured transversely on the ends of yoke 11 and engage spring loaded tubular members 20 which slip over the aircraft nosewheel 40 axle extension 55 shown as dotted lines in FIGURE 3. When the tow bar is to be positioned about such an axle, tubular members 20 are pulled outwardly. A cooperating retaining pin 56 and slot 57 are provided. The pin is positioned through sleeves 19 near one inner end portion thereof. An L-shaped slot 57 is longitudinally cut at opposite sides of tubular member 20. The pin 56 is adapted to slide therein. In order to lock tubular member 20 in its most outard position, the member is pulled outwardly until the pin rests at the end of slot 57 at its base portion. Then the tubular member 20 is rotated through a small arc so that it is retained by the lowermost portion of the slot or rests at a point shown by reference numeral 58. A spring 59 is positioned between pin 56 and a pin 60 positioned transversely near the outermost end portion of tubular member 20. The pin extends beyond the side portions of tubular member 20 so that it affords a hand gripping section. When the tube 20 is in position on axle 55, the tube may then be rotated back to a position so that pin 58 may slide along slot 57. Coiled spring 59 will be seen to urge the tubular member 20 inwardly and towards axle 55, thereby gripping the axle since the oppositely positioned tubular member 20 mounted on the opposite end portions of yoke 11 affords a gripping action on axle 55.

When it is desired to release the tow bar from the nose wheel of the airplane, it is only necessary to once again pull out tubular members 20 at both sides of the nose wheel and to lock it in place by bringing pin 56 into slot portion 58.

It has been discovered that in some instances the yoke portion 11 does not readily fit over the nose wheel of an aircraft because of a particular configuration or structure of the nose wheel hub and axle. In such an instance, a second embodiment showing a different yoke portion must be utilized. However, the other components, namely the lever and shoe arrangement 18 and the gripping means shown in FIGURE 4 are still applicable to carry out the basic principle of the invention. In connection therewith, attention is directed to FIGURES 7 and 8. It will be seen therefrom that tubular base 14 has only one yoke portion 61 as was utilized in connection with the embodiment shown in FIGURE 3. The other side of the yoke portion is shown as a tubular member 62 which is rotatable through an angle of approximately 100 degrees, so that it may be brought to and from the nose wheel after yoke 61 is already in position on the axle of the nose wheel. It will be seen that a tubular stub arrangement 63 is provided on one end of base 14. Yoke portion 62 has a right angle tubular member 64 which is of a slightly smaller diameter than stub portion 63. Member 64 has a pin 65 which is at right angles thereto and rides in L-shaped slot 66 in stub portion 63. This slot 66 has a camming action on member 62 so that when pin 65 rides from one end of the slot to the other, it moves away or towards a position which is opposite the axle gripping means on yoke portion 61.

In order to obtain full effect of the tow bar of the present invention, it is a desirable feature to employ strong tubular steel from which the tow bar can be constructed. Additionally, wherever possible, good welds should be made between the pieces. Additionally, in order to accomplish good frictional contact, the actuating shoe 31 should have a portion which may be made of a conventional ribbed nature 67 shown in FIGURE 3.

The tow bar of the present invention makes it possible to obtain a horizontal pulling force on an airplane of approximately 1200 pounds by the exercise of about 150 pounds force on the handle of the device.

It will be apparent that many changes and modifications of the several features described herein may be made without departing from the spirit and scope of the invention. It is therefore apparent that the foregoing description is by way of illustration of the invention rather than limitation of the invention.

In operation, should it be desired to move an aircraft having a tricycle landing gear, the device of the present invention is secured to the nose wheel as shown in FIGURE 1 and the lever and shoe arrangement is moved so that shoe 31 is in abutment with the peripheral portion of the tire. By applying downward pressure on handle 12 as in the direction "A," the device will apply a torque to the tire by means of the action of lever and shoe arrangement 18. It is pointed out that in the operation of the device the lever and shoe arrangement performs the mechanical equivalent of a pawl, while the tire-wheel combination performs the mechanical equivalent of a ratchet wheel for torque amplification in moving the aircraft forward. By pumping the device the aircraft may be moved to the desired position. In order to move the aircraft rearwardly, tubular member 15 is rotated after releasing the lever and shoe arrangement from the tire 40. Lever and shoe arrangement 18 may then assume the position shown in FIGURE 2 by re-applying it to the tire. A lifting movement along arc "B" is then applied to the device in order to move the aircraft backwards.

What is claimed is:

1. A device for obtaining mechanical advantage in the movement of aircraft when engaging a wheel in the landing gear, comprising a frame having an elongated portion and a yoke portion, an elongated tubular member rotatably mounted on said elongated portion, said yoke portion having means adapted to grip the axle of the wheel, lever means pivotally mounted near one end of said tubular member, said lever means carrying an actuating friction member adapted to be held against the periphery of said wheel, when the device is pivoted about the axle of the wheel in a direction towards the lever means.

2. The device of claim 1 wherein the lever means is biased by spring means towards the yoke portion.

3. A device for obtaining mechanical advantage in the movement of aircraft when engaging wheel in the landing gear, comprising a frame having an elongated portion and a yoke portion, an elongated tubular member rotatably mounted on said elongated portion, said yoke portion having means adapted to grip the axle of the wheel, a first lever means pivotally mounted near one end of said tubular member, said first lever means carrying an actuating friction member adapted to be held against the periphery of said wheel, when the device is pivoted about the axle of the wheel in a direction towards the lever means, a pivotally mounted second lever mounted near substantially the other end of said tubular member, coupling means connecting said first lever means and said second lever whereby arcuate movement of said second lever effects arcuate movement of said first lever means.

4. The device of claim 3 wherein the lever means is biased by spring means towards the yoke portion.

5. The device of claim 3 wherein the gripping means for the axle of the wheel includes sleeve members mounted transversely on the end portions of said yoke, tubular members urged inwardly and adapted to slip over the axle of the wheel.

6. The device of claim 3 wherein at least one side of said yoke portion is pivotally mounted with respect to said elongated portion of the frame.

7. The device of claim 5 wherein at least one side of said yoke portion is pivotally mounted with respect to said elongated portion of the frame.

8. The device of claim 5 wherein the lever means is biased by spring means towards the yoke portion.

9. The device of claim 6 wherein the lever means is biased by spring means towards the yoke portion.

10. The device of claim 7 wherein the lever means is biased by spring means towards the yoke portion.

References Cited in the file of this patent

UNITED STATES PATENTS

| | | |
|---|---|---|
| 1,614,764 | Rowell | Jan. 18, 1927 |
| 2,391,608 | Wood | Dec. 25, 1945 |
| 2,424,095 | Horton | July 15, 1947 |
| 2,449,680 | Wak | Sept. 21, 1948 |
| 2,773,703 | Ferguson et al. | Dec. 11, 1956 |

FOREIGN PATENTS

| | | |
|---|---|---|
| 517,795 | Great Britain | Feb. 8, 1940 |